United States Patent [19]

Tamura

[11] 4,007,922
[45] Feb. 15, 1977

[54] EXTRUDING DEVICE FOR HIGH MOLECULAR MATERIALS

[75] Inventor: Yukio Tamura, Obu, Japan

[73] Assignee: Mitsubishi Jukogyo Kabushiki Kaisha, Tokyo, Japan

[22] Filed: Apr. 14, 1975

[21] Appl. No.: 567,839

[30] Foreign Application Priority Data

Apr. 15, 1974 Japan .................. 49-40952

[52] U.S. Cl. ............................................. 259/191
[51] Int. Cl.² ....................................... B29B 1/10
[58] Field of Search .......... 259/185, 191, 193, 194, 259/9, 10, 97, DIG. 11, DIG. 13; 425/202, 205, 208, 209, 204, 207; 100/144, 147; 415/72; 198/213, 215

[56] References Cited

UNITED STATES PATENTS

| 2,519,014 | 8/1950 | Bankey ........................... 425/208 |
| 2,810,159 | 10/1957 | Teichmann ................... 425/207 X |

FOREIGN PATENTS OR APPLICATIONS

| 1,037,698 | 8/1958 | Germany ........................ 425/209 |
| 2,044,364 | 9/1970 | Germany ........................ 259/191 |
| 20,979 | 10/1963 | Japan .............................. 425/205 |
| 4,574 | 10/1965 | Japan .............................. 425/205 |

Primary Examiner—Philip R. Coe
Attorney, Agent, or Firm—Darby & Cushman Cushman

[57] ABSTRACT

The invention is an extruding device which includes a screw and a barrel wherein the screw includes a kneading portion whose cross-section differs from the cross-section of the remainder of the screw and the barrel includes a kneading portion whose cross-section differs from the cross-section of the remainder of the barrel and is opposite to the kneading portion of the screw, the cross-sections of the two kneading portions being such that the distance between a point on the periphery of the kneading portion of the screw and the nearest point on the interior surface of the barrel, measured in a radial direction, varies on rotation of the screw in the barrel. The extruding device exerts an improved kneading effect upon extruded material.

8 Claims, 22 Drawing Figures

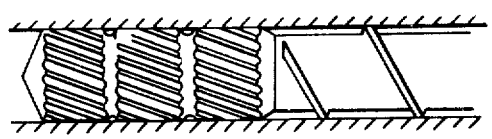
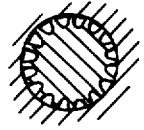
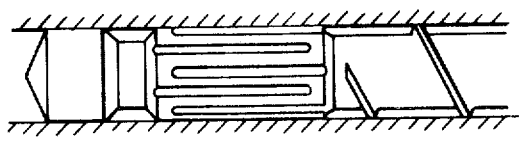
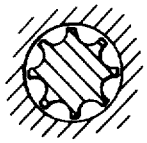
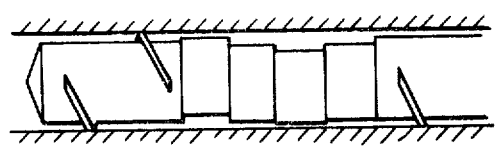
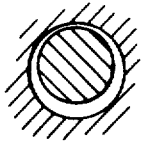
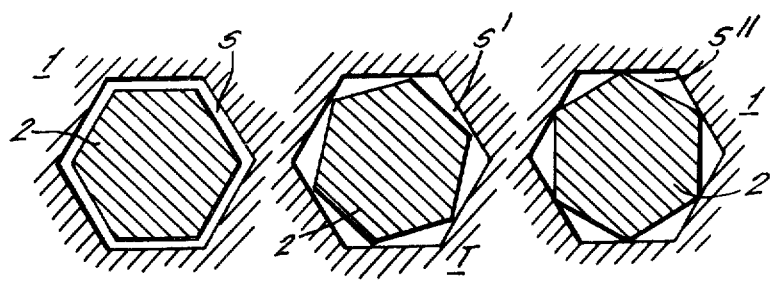
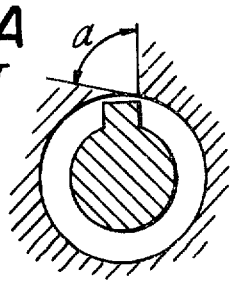
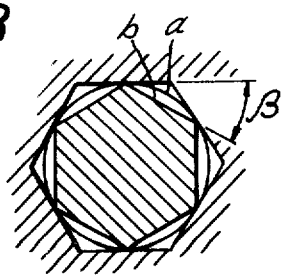

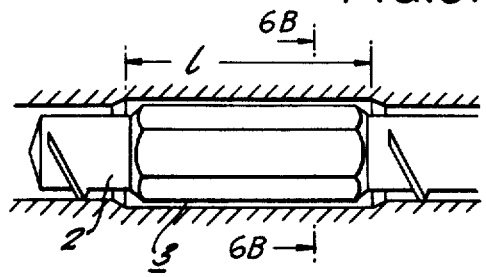
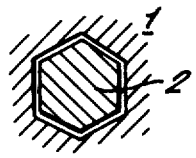
FIG.6A    FIG.6B
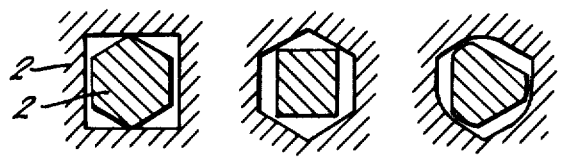
FIG.7A    FIG.7B    FIG.7C
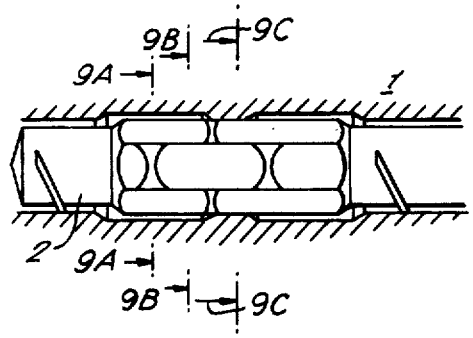
FIG.8.
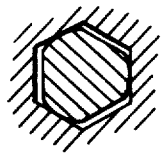
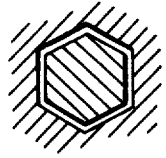
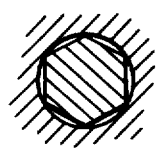
FIG.9A    FIG.9B    FIG.9C
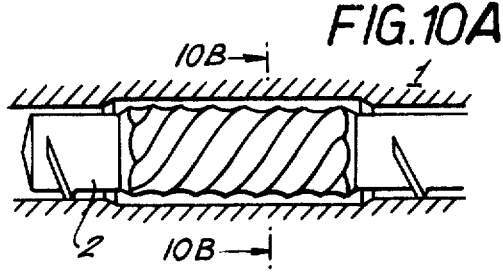
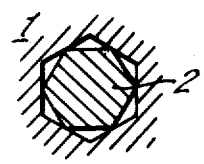
FIG.10A    FIG.10B

EXTRUDING DEVICE FOR HIGH MOLECULAR MATERIALS

FIELD OF THE INVENTION

The present invention relates to an extruding device for use in the extrusion of high molecular weight materials such as rubber and plastics materials. The extruding device may, for example, form part of an injection moulding machine or the like.

BACKGROUND OF THE INVENTION

In a uni-axial extruding device for plastics materials and the like, it is very important to knead fully a resin, and for the purpose of achieving sufficient kneading, various kneading mechanisms have been proposed in Japan, as illustrated in FIGS. 1, 2 and 3. As is apparent from these figures, particularly the cross-sections of the kneading mechanisms, the spaces through which the resin passes have the same configuration regardless of the angular position of the screw during its rotational motion. Consequently the resin within the screw rotates integrally with the screw and the resin mass undergoes little deformation, so that the kneading mechanisms have the disadvantage that they do not subject the resin mass to a strong shearing stress and thus the kneading effect achieved is small.

SUMMARY OF THE INVENTION

The invention provides an extruding device, comprising:
a barrel having internal wall means defining a longitudinally elongated chamber;
a longitudinally elongated screw received in said barrel chamber with its sense of longitudinal elongation generally parallel to the sense of elongation of said barrel chamber, for angular rotation of said screw about said sense of longitudinal elongation of said screw;
said barrel chamber and said screw each having a longitudinally intermediate portion which longitudinally coextend with one another over at least a major part of the length of each such portion to provide a kneading portion of the extruding device;
said barrel chamber and said screw, within said kneading portion, each having a polygonal transverse cross-sectional figure, which may be respectively inscribed and circumscribed with respective imaginary circles of substantially the same diameter, so that each apex on the transverse cross-sectional figure of the screw within said kneading portion is alternately brought immediately radially adjacent and substantially radially spaced from said internal wall means of said barrel chamber as the screw is angularly rotated;
said barrel chamber and said screw each undergoing a substantial change in transverse cross-sectional shape at each end of each respective longitudinally intermediate portion which provides said kneading portion.

According to the present invention there is provided an extruding device which includes a screw and a barrel wherein the screw includes a kneading portion whose cross-section differs from the cross-section of the remainder of the screw and the barrel includes a kneading portion whose cross-section differs from the cross-section of the remainder of the barrel and is opposite to the kneading portion of the screw, the cross-sections of the two kneading portions being such that the distance between a point on the periphery of the kneading portion of the screw and the nearest point of the interior surface of the barrel, measured in a radial direction, varies on rotation of the screw in the barrel.

In one preferred form of the invention, the extruding device is provided with a kneading section in at least one stage that comprises a portion on an inner surface of the barrel whose cross-section at right angles to the axial direction of the barrel is of polygonal shape and which extends in the axial direction, and a portion on the screw at a position opposed to said inner surface portion of the barrel whose cross-section at right angles to the axial direction is of polygonal shape and which extends in the axial direction.

BRIEF DESCRIPTION OF THE DRAWINGS

The invention will be further illustrated with reference to the accompanying drawings showing, by way of example, embodiments of the invention, in which:

FIGS. 1A and 1B, 2A and 2B and 3A and 3B, respectively, are general diagrammatic views of various kneading mechanisms in an extruding machine for high molecular materials known in Japan;

FIGS. 4A, 4B and 4C, and FIGS. 5A and 5B are diagrammatic views for explaining the principle of the kneading mechanism according to the present invention;

FIG. 6A is a longitudinal cross-section view of part of one preferred embodiment of the invention;

FIG. 6B is a cross-sectional view taken along line 6B—6B in FIG. 6A;

FIGS. 7A, 7B and 7C show examples of various transverse cross-section configurations of the kneading section;

FIG. 8 is a longitudinal cross-section view of part of another preferred embodiment of the present invention;

FIG. 9A is a cross-section view taken along line 9A—9A in FIG. 8;

FIG. 9B is a cross-section view taken along line 9B—9B in FIG. 8;

FIG. 9C is a cross-section view taken along line 9C—9C in FIG. 8;

FIG. 10A is a longitudinal cross-section view of a further embodiment of the present invention; and FIG. 10B is a cross-sectional view taken along line 10B—10B in FIG. 10A.

FIGS. 4A, 4B and 4C and FIGS. 5A and 5B are diagrammatic views for explaining the present invention, in which reference numeral 1 designates a cylinder or barrel and numeral 2 designates a screw that is rotatably fitted in the barrel 1. The transverse cross-sections (the configuration on a cross-section at right angles to the axial direction) of the barrel 1 and the screw are polygonal in shape, and between the inner wall surface of the barrel 1 and the outer wall surface of the screw 2 is formed a gap or space S as shown in FIG. 4A. This space S serves as a passageway for resin that is extruded while being kneaded, and since space S changes in shape into S' and further into S'' in accordance with the rotation of the screw as illustrated in FIGS. 4B and 4C, the mass of resin fed into the kneading section is forcibly deformed as the screw 2 rotates. For instance, in the case where the barrel 1 and the screw 2 have hexagonal cross-sections configuration, as illustrated, then the mass of resin is forcibly deformed six times during one revolution of the screw 2. Still further, in the illustrated case, the angle $\beta$ formed between a circle $a$ circumscribing the screw 2 and inscribing the barrel 1 and a contour line *b* as shown in FIG. 5B is far smaller than the angle α in the conventional full flight screw as shown in FIG. 5A, so that the resin would enter into the wedge-shaped space portion between the inner wall surface of the barrel 1 and the outer wall surface of the screw 2 to be subjected to a strong shearing stress, and therefore the resin undergoes a sufficient kneading action.

FIGS. 6A and 6B show one preferred embodiment of the present invention, in which reference numeral 1 designates a barrel, numeral 2 designates a screw, and numeral 3 designates a kneading section. The cross-section (the configuration on a cross-section at right angles to the axial direction) of the portion of the inner surface of the barrel 1 extending in the axial direction over a length l, the kneading portion, is in the form of a polygon (a hexagon in the illustrated example). The cross-section of the portion of the screw 2 that is substantially opposed to the kneading portion of the inner surface of the barrel 1 extending over the length l is also formed as a polygon (hexagon), and between these polygonal portions is formed the kneading section 3. While the kneading section 3 is provided in one stage in the illustrated example, it will be appreciated that the kneading section 3 could be provided in a plurality of stages along the axial direction of the barrel 1.

With regard to the cross-sections of the kneading portions of the barrel 1 and the screw 2, various configurations are possible and some examples are illustrated in FIGS. 7A, 7B and 7C.

The embodiment of the present invention illustrated in FIG. 8 and FIGS. 9A, 9B and 9C differs from the above-described embodiment illustrated in FIGS. 6A and 6B in that a dam is provided in the passageway of the resin between the cylinder 1 and the screw 2 in the kneading section 3. The embodiment illustrated in FIGS. 10A and 10B differs in that the kneading portion of the screw 2 in the kneading section 3 is twisted as shown in FIG. 10A to make the kneading portion have a lead.

In operation of the extruding devices in accordance with the invention and described above the resin mass fed into the kneading section 3 undergoes forced deformation while it passes through the kneading section 3 in accordance with rotation of the screw 2. Owing to the deforming action, a uniform and strong shearing stress is applied to the whole of the resin mass. This action results in a pounding effect as in the case of "rice-cake making", in addition to the shearing effect caused by a relative movement of two planes of a screw in the conventional uni-axial extruding machine.

Furthermore, where the cross-sections of the barrel 1 and the screw 2 in the kneading section 3 are polygonal, transfer of the resin towards the side of the barrel 1 or towards the side of the screw 2 with respect to the circle circumscribing and inscribing these polygons would arise, and thereby the kneading effect is further promoted.

With the illustrated extruding devices according to the invention, during the kneading operation in the kneading section a uniform and strong shearing stress is applied to the whole of the resin mass, so that the kneading effect can be greatly enhanced in comparison to the devices illustrated in FIGS. 1A through 3B. Since no local heat generation occurs, the temperature of the resin is also made uniform, resulting in excellent dispersion of the resin. Accordingly, a practical effect can be achieved in that high delivery extrusion of the resin becomes possible.

Furthermore, if the kneading is provided where a solid bed is destroyed and an unmolten resin is mixed in a molten resin, a substantial effect can be expected. Also if provision is made such that a resin that has been preliminarily heated uniformly up to the proximity of a melting temperature is fed into the kneading section of the present invention (that is, in the case of extrusion of preheated materials), then a further advantage can be obtained that the kneading effect is still further enhanced.

What we claim is:
1. An extruding device, comprising:
    a barrel having internal wall means defining a longitudinally elongated chamber;
    a longitudinally elongated screw received in said barrel chamber with its sense of longitudinal elongation generally parallel to the sense of elongation of said barrel chamber, for angular rotation of said screw about said sense of longitudinal elongation of said screw;
    said barrel chamber and said screw each having a longitudinally intermediate portion which longitudinally coextend with one another over at least a major part of the length of each such portion to provide a kneading portion of the extruding device;
    said barrel chamber and said screw, within said kneading portion, each having a polygonal transverse cross-sectional figure, which may be respectively inscribed and circumscribed with respective imaginary circles of substantially the same diameter, so that each apex on the transverse cross-sectional figure of the screw within said kneading portion is alternately brought immediately radially adjacent and substantially radially spaced from said internal wall means of said barrel chamber as the screw is angularly rotated;
    said barrel chamber and said screw each undergoing a substantial change in transverse cross-sectional shape at each end of each respective longitudinally intermediate portion which provides said kneading portion.
2. The extruding device of claim 1, wherein:
    the polygonal transverse cross-sectional shape of both said barrel chamber and said screw within said kneading portion is hexagonal.
3. The extruding device of claim 1, wherein:
    the polygonal transverse cross-sectional shape of the barrel chamber within said kneading portion is square.
4. The extruding device of claim 1, wherein:
    the polygonal transverse cross-sectional shape of the barrel chamber within said kneading portion is hexagonal.
5. The extruding device of claim 1, wherein:
    the polygonal transverse cross-sectional shape of the screw within said kneading portion is square.
6. The extruding device of claim 1, wherein:
    the polygonal transverse cross-sectional shape of the screw within said kneading portion is hexagonal.
7. The extruding device of claim 1, wherein:
    the polygonal transverse cross-sectional shape of the barrel chamber within said kneading portion is hexagonal; and
    the polygonal transverse cross-sectional shape of the screw within said kneading portion is square.
8. The extruding device of claim 1, wherein:
    the polygonal transverse cross-sectional shape of the barrel chamber within said kneading portion is square; and
    the polygonal transverse cross-sectional shape of the screw within said kneading portion is hexagonal.

* * * * *